US007266523B2

(12) United States Patent
Depura et al.

(10) Patent No.: US 7,266,523 B2
(45) Date of Patent: Sep. 4, 2007

(54) METHOD AND APPARATUS FOR ALLOCATING INTERVIEWS BASED ON DYNAMIC PRICING OR AUCTIONS USING ELECTRONIC NETWORKS

(75) Inventors: Shailendra Depura, Norristown, PA (US); Javid Muhammedali, Worcester, MA (US)

(73) Assignee: Adamshand, Inc., Shrewsbury, MA (US)

( * ) Notice: Subject to any disclaimer, the term of this patent is extended or adjusted under 35 U.S.C. 154(b) by 592 days.

(21) Appl. No.: 10/205,687

(22) Filed: Jul. 26, 2002

(65) Prior Publication Data

US 2003/0084051 A1 May 1, 2003

(51) Int. Cl.
  *G06Q 30/00* (2006.01)
  *G06F 17/30* (2006.01)
(52) U.S. Cl. .......................... 705/37; 707/10; 709/203
(58) Field of Classification Search .................. 707/1, 707/2, 10, 104.1, 102; 709/203; 713/201, 713/202; 705/37
  See application file for complete search history.

(56) References Cited

U.S. PATENT DOCUMENTS

| 5,671,409 | A | * | 9/1997 | Fatseas et al. | 707/104.1 |
| 6,161,099 | A | * | 12/2000 | Harrington et al. | 705/37 |
| 6,213,780 | B1 | * | 4/2001 | Ho et al. | 434/219 |
| 6,363,376 | B1 | * | 3/2002 | Wiens et al. | 707/3 |
| 6,370,510 | B1 | * | 4/2002 | McGovern et al. | 705/1 |
| 6,466,914 | B2 | * | 10/2002 | Mitsuoka et al. | 705/9 |
| 6,537,072 | B2 | * | 3/2003 | Kanevsky et al. | 434/219 |
| 6,587,832 | B1 | * | 7/2003 | Beck et al. | 705/9 |
| 6,618,734 | B1 | * | 9/2003 | Williams et al. | 707/102 |
| 6,647,373 | B1 | * | 11/2003 | Carlton-Foss | 705/37 |
| 6,662,194 | B1 | * | 12/2003 | Joao | 707/104.1 |
| 6,665,649 | B1 | * | 12/2003 | Megiddo | 705/37 |
| 6,685,478 | B2 | * | 2/2004 | Ho et al. | 434/219 |
| 6,711,589 | B2 | * | 3/2004 | Dietz | 707/104.1 |
| 6,718,312 | B1 | * | 4/2004 | McAfee et al. | 705/37 |
| 6,813,612 | B1 | * | 11/2004 | Rabenold et al. | 705/37 |
| 2002/0147708 | A1 | * | 10/2002 | Thomas et al. | 707/3 |
| 2003/0041010 | A1 | * | 2/2003 | Yonao-Cowan | 705/37 |

FOREIGN PATENT DOCUMENTS

| JP | 2003050929 A | * | 2/2003 |
| JP | 2003173399 A | * | 6/2003 |
| JP | 2005222168 A | * | 8/2005 |
| KR | 2002094073 A | * | 12/2002 |

* cited by examiner

*Primary Examiner*—Cheryl Lewis
(74) *Attorney, Agent, or Firm*—Brian M. Dingman, Esq.; Mirick O'Connell DeMallie & Lougee

(57) ABSTRACT

An electronic interview auction method for auctioning an interview for a job, wherein the auction is conducted using at least an auctioneer's computer and one or more bidders' computers communicating electronically over a network, wherein a client may be the auctioneer, or the client and auctioneer may be separate. The method contemplates establishing criteria for the auction and storing the criteria on the auctioneer's computer, allowing potential bidders to access the stored criteria from a bidder's computer by electronic communication with the auctioneer's computer, storing in the auctioneer's computer submitted bid information, including relevant job-related information and a monetary bid, automatically selecting one or more winning bids based on the stored monetary bids, and allowing the user to select other bids with monetary values less than the monetary value of the highest bid.

25 Claims, 5 Drawing Sheets

METHOD AND APPARATUS FOR ALLOCATING INTERVIEWS BASED ON DYNAMIC PRICING OR AUCTIONS USING ELECTRONIC NETWORKS

FIELD OF THE INVENTION

This invention relates to a method of dynamically obtaining prices that people are willing to pay to secure an interview conducted to evaluate, qualify and select one or more persons to perform any and all projects, employment, or service.

BACKGROUND OF THE INVENTION

Electronic message boards and classified listings commonly are used to facilitate the exchange of information between hirers and applicants. Internet web sites including Monster.com (U.S. Pat. No. 5,832,497 to Taylor), focus specifically on the collection, storage, retrieval and indexed or keyword searching of stored application materials and resumes. The system envisages charging fees for access to such databases and also to control access of applicants based on the payment of a fee.

These job-listing systems have a substantial drawback from the point of view of the applicant in that no tangible measure of service is provided in return for payment. Many such services therefore are offered free. There is no guarantee of any positive outcome for the applicant, who may have no knowledge of the procedures that the company may use in evaluating the application. This system and similar ones exhort applicants to submit their personal information and may make it available to any and all potential employers. In return, the applicants may receive an interview call leading to a job offer, but in the vast majority of cases they receive automated responses or a cursory rejection notice. These systems, by increasing the efficiency of the methods of submitting applications, have induced applicants to apply to ever-increasing numbers of companies without seriously considering their qualifications or even interest to work for the company.

This has led to a situation wherein qualified and interested candidates must submit to the same process as the unqualified majority, leading to a situation where qualified candidates feel it a waste of time trying to apply through these automated channels and rely instead on time tested personal networks and "friends and family" to turn up job leads.

Electronic auctioning and trading systems are known, as described in U.S. Pat. No. 5,640,569 to Miller et al, U.S. Pat. No. 5,243,515 to Lee, U.S. Pat. Nos. 5,136,501 and 5,077,665 to Silverman et al, U.S. Pat. No. 4,789,928 to Fujisaki U.S. Pat. No. 3,581,072 to Nymeyer, U.S. Pat. No. 6,311,164 to Ogden, and U.S. Pat. No. 6,161,099 to Harrington et al.

The Miller patent relates to an electronic "auctioning" system specifically directed to allocating computer resources such as transmission bandwidth of a multiplicity of network links interconnecting the users. The system allocates resources to maximum declared values based upon the second highest bid such that successful bidders are charged an opportunity cost for the goods.

The Lee patent discloses a secure teleprocessing bidding system relating to a secret bidding process. The system maintains the bids secret from other bidders until after the period for bidding is closed. The system is intended to eliminate bid procedure violations and provides an electronic record of the bids received.

The Silverman et al. patents disclose an electronic trade matching system for trading instruments in which bids are automatically matched against offers for the given trading instruments. The system uses a network to connect the host computer with bidding and offering clients of the system.

The Fujisaki patent discloses an auction information transmission processing system that sets up a hierarchical system of host and server computers, which are configured to minimize the data transmitted between computers during an auction. The system is designed to allow auction participants to be spread out over a wide area. The system was directed to auctioning of specific items such as used cars.

The Nymyer patent discloses an apparatus that automates the process of price determination in a market for fungible goods and consequently eliminates or reduces the influence of human judgment in such price determinations.

The Ogden patent discloses a method and apparatus that receives job application information from job applicants using automated, electronic methods. It is designed to remove human errors in obtaining, processing and storing applicant related information while reducing the cost of procuring such information incurred by hiring companies.

The Harrington et al. patent discloses an Internet-based municipal bond auction system in which the auctioneer maintains an auction database that is accessed by users by a conventional Internet browser.

SUMMARY OF THE INVENTION

The prior art is applicable to diverse fields of interest, goods and services but not to the novel and useful service of allocating job interviews. The present invention identifies and presents the job interview as a useful, rare good, the price of which is determined by a system that allows dynamic pricing, allowing the forces of supply and demand to interact in an environment of good information.

This invention brings job interviews and screening applicants within the auction mode of allocation, with hirers and recruiters soliciting payment in return for their services. Often, companies pay job applicants in the form of reimbursements for travel and expenses related to the interview process, but neither seek nor receive compensation for the time, effort and expense of conducting such interviews.

The prior art includes two major types of auctions; sealed-bid and increasing bid. The present invention implements a third type of auction, where bidders can intentionally offer prices that are lower than the current highest bid, on the strength of their qualifications, and the auctioneer has the discretion to accept this bid.

This invention features an apparatus and method for allocating interviews, based on prices offered reflecting supply and demand for any and all interview(s) that precedes any employment or contract, of a temporary or permanent nature, over electronic networks, particularly the Internet. The auctioneer maintains a database from which information about interviews to be allocated can be obtained and prices offered, either through a web site maintained by the auctioneer or through electronic mail, electronic messages, letter mail, telephone, facsimile or other means.

A client participates in the auction by accessing the database ordinarily via the auctioneer's web site, accessed by means of a conventional Internet browser. The client is led through a sequence of screens that perform the functions of verifying the client's identity, assisting the client in preparing an auction, in creating the rules of the auction, in providing contact information for the bidder to communicate bid details and requests for information to the client, paying the auction fee, and authorizing the posting of the offer for public bidding.

Clients are individuals, companies, organizations, governments, institutions, or their agents, that are able to offer employment or funding for projects or services to bidders.

A bidder participates in the auction ordinarily by accessing the database via the auctioneer's web site, accessed by means of a conventional Internet browser. The bidder is led through a sequence of screens that perform the functions of verifying the bidder's identity, assisting the bidder in preparing a bid, verifying that the bid conforms to the rules of the auction, providing a means for the bidder to communicate bid details to the client, displaying to the bidder during the course of the auction selected information regarding bids received from competitive bidders, and informing the bidder how much time remains in the auction.

The bidder may be given the option of confirming the accuracy of his bid before submitting the bid. The auctioneer is able to review bidding history, determine the winner or winners, notify the winner(s) over the network, and display selected auction results to bidders, clients and observers over the network. The client may or may not act as the auctioneer.

Bidders are individuals, companies, organizations, governments, institutions, or their agents, that are able to accept employment, undertake projects, or perform services for the benefit of others.

The auctioneer maintains a database on a computer accessible to the electronic network used to conduct the auction, typically comprising the Internet. The database includes information about interviews to be conducted. The auctioneer's computer also maintains other information as described above. The auctioneer can be a third party service provider or may be the client.

According to one embodiment, the invention is directed to a computer implemented process comprised of the steps of: establishing communications over a network between an auctioneer's computer and a plurality of bidders' computers, and providing information regarding the jobs for which interviews are to be allocated among potential bidders.

The invention also provides for selectively transmitting via the network and displaying selected auction and bid status information during the course of the auction to non-bidding observers of the auction on the observers' computers. This allows for third party observation of the auction in real time. The invention can selectively provide information concerning the auction to participants and observers from the auctioneer's computer via the network after the closing of the auction. The invention also provides for verifying that each bid is in conformance with predetermined bid parameters and gives the bidder an opportunity to review and confirm bids prior to the bids being actually recorded on the auctioneer's computer. The bid verification may include automatically refusing acceptance of submitted bids that do not conform to predetermined bid parameters, and providing feedback to the bidder of a proposed bid by providing the bidder with a summary of the proposed bid prior to bid submission. The invention also screens bidders via the network to qualify bidders to submit bids, and provides documentation of the qualification of the individual bidders. This system also obtains payment for the bid amount from bidders at the time the bid is placed, and stores the payment information to obtain payment at a later date if desired.

The invention is accomplished with a plurality of computers that are connected to an electronic network, in particular the Internet. Each bidder may use their own personal computer. The bidders' computers are provided with commercially available browser software that communicates through the network with an auctioneer's server. Auction terms and conditions, and a description of the jobs for which interviews are being held, the time, duration, location and manner of the interview, may be broadcast or otherwise made available by the auctioneer's server to the bidders' computers. During the auction the auctioneer's server broadcasts or otherwise makes available selected bid information such as bidder status (e.g., leader or not leader), or the current highest bid and, if desired, the identity of the current highest bidder. Software on the server, or perhaps on the bidders' computers in a JAVA or similar implementation, guides the bidders through the bidding process and provides computational assistance in preparing bids and comparing them to the current highest bid. The bidder may prepare a tentative bid, review it, and modify it before submitting it. A confirmation step may be implemented to insure that the bid is correct before it is submitted. When a bid is "submitted", it is compared with the current highest bid. If the submitted bid is higher than the current highest bid, it becomes the new current highest bid and, if desired, is made available to all bidders. At the close of the auction, the auctioneer's computer notifies the bidders' computers of the highest bid. The auctioneer's computer also maintains a database of all bids which can be accessed by interested parties for their own use.

In addition to the aforementioned information, the present invention can allow and solicit bids to be placed intentionally at the same price as or lower than the current highest bid. A price interval may be specified between new bids and previously entered bids, but no condition is imposed that new bids must be higher than existing bids. This facilitates the dynamic pricing of interview slots being auctioned, wherein bidders state their preferred price or the price they are willing to pay for the interview. If the hirer desires to interview the bidder, the bidder will become liable to pay the bid amount. The user can also set a minimum or reserve bid amount required in order for any bid to be accepted. The number of interviews to be held is left to the discretion of the hirer, although it may not be less than the number announced as part of the auction rules. The hirer may interview more people than originally proposed. The hirer agrees to interview the top bidder so that an outcome is ensured for the auction. The hirer may choose not to interview the top bidder and offer instead to compensate the top bidder by paying a fee, which may be a fraction of the top bid. Each bidder has the opportunity to obtain an interview, regardless of the price they offer. The bidders are typically presented to the hiring manager in the order of their offer price.

The bidder as part of the application materials may be required to submit some information that will be part of the applicant's "Public Profile." This Public Profile may be made available to all competitive bidders, employers and observers. Through the Public Profile system, a system of natural selection is engendered, wherein a potential bidder evaluates his or her own qualifications and interest towards a particular opportunity and compares it with the published qualifications of competing bids before placing a bid for the interview. Once a bid is placed, the candidate may not be allowed to retract the bid or be allowed to do so only within a specified time period, at which time the prerogative to accept the bid transfers to the hirer.

Bidders may hold accounts with the auctioneer where funds that will be used on individual auctions will be paid into prior to the start of the auction. These funds would be paid into an account that each bidder holds with the auctioneer. The payment may be made by the bidder or by another. The funds may be paid into the account through a variety of means including checks, credit cards, cash, coupons and promotional codes, purchased from the auctioneer or their agents, distributors and franchises. These funds or parts thereof may or may not be refundable.

DESCRIPTION OF THE DRAWINGS

Other objects, features and advantages will occur to those skilled in the art from the following description of the preferred embodiment and the accompanying drawings, in which.

DESCRIPTION OF THE PREFERRED EMBODIMENT

In the preferred embodiment, the auctioneer maintains a database that is accessed via the Internet by both the user or client (the employer) and the bidder (the candidate). Alternatively, the website could be maintained by the employer. This detail is typically resolved according to the computer and database expertise and size of the employer, and by the relationship between the auctioneer and the employer. It should be understood that the use of the terms "employer" and "candidate" in the flow charts is not a limitation of the invention, either.

Figure 1:
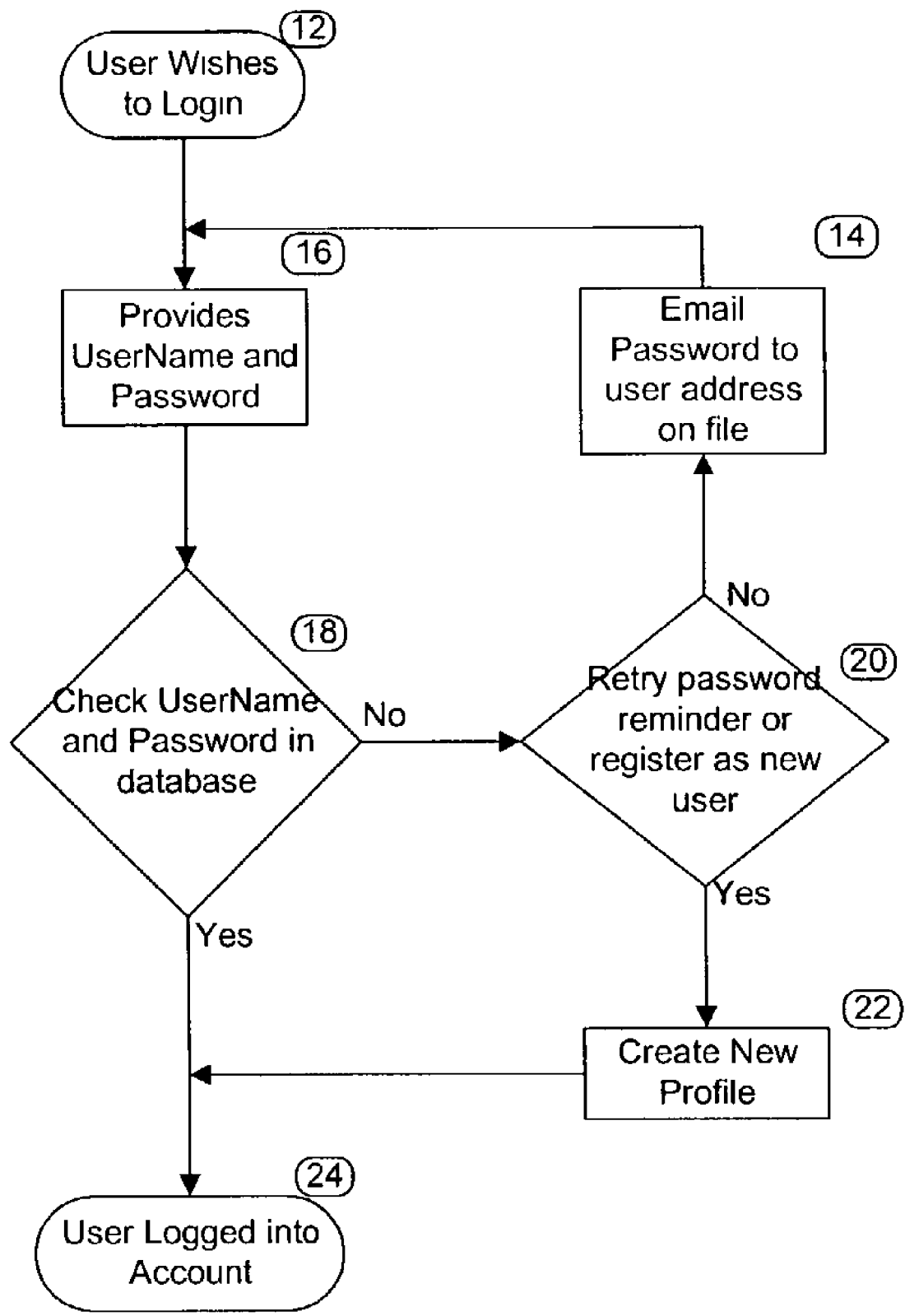
FIG. 1 is a flow chart of the log-in process for the website that accomplishes the preferred embodiment of the invention.

Employers and Candidates (Users) must register as users of the invention in order to use the features to the fullest extent. As depicted in FIG. 1, any user who wishes to login 12 uses a unique username and a secret password to access the site. If the user does not have a valid user name, 18 he will be unable to log in. If a user has not registered previously, 20 he will be asked to provide registration information 22 and choose a unique username. If a registered user has forgotten his username or password, 20 these will be emailed 14 to him using the email address provided at the time of registration.

Figure 2:
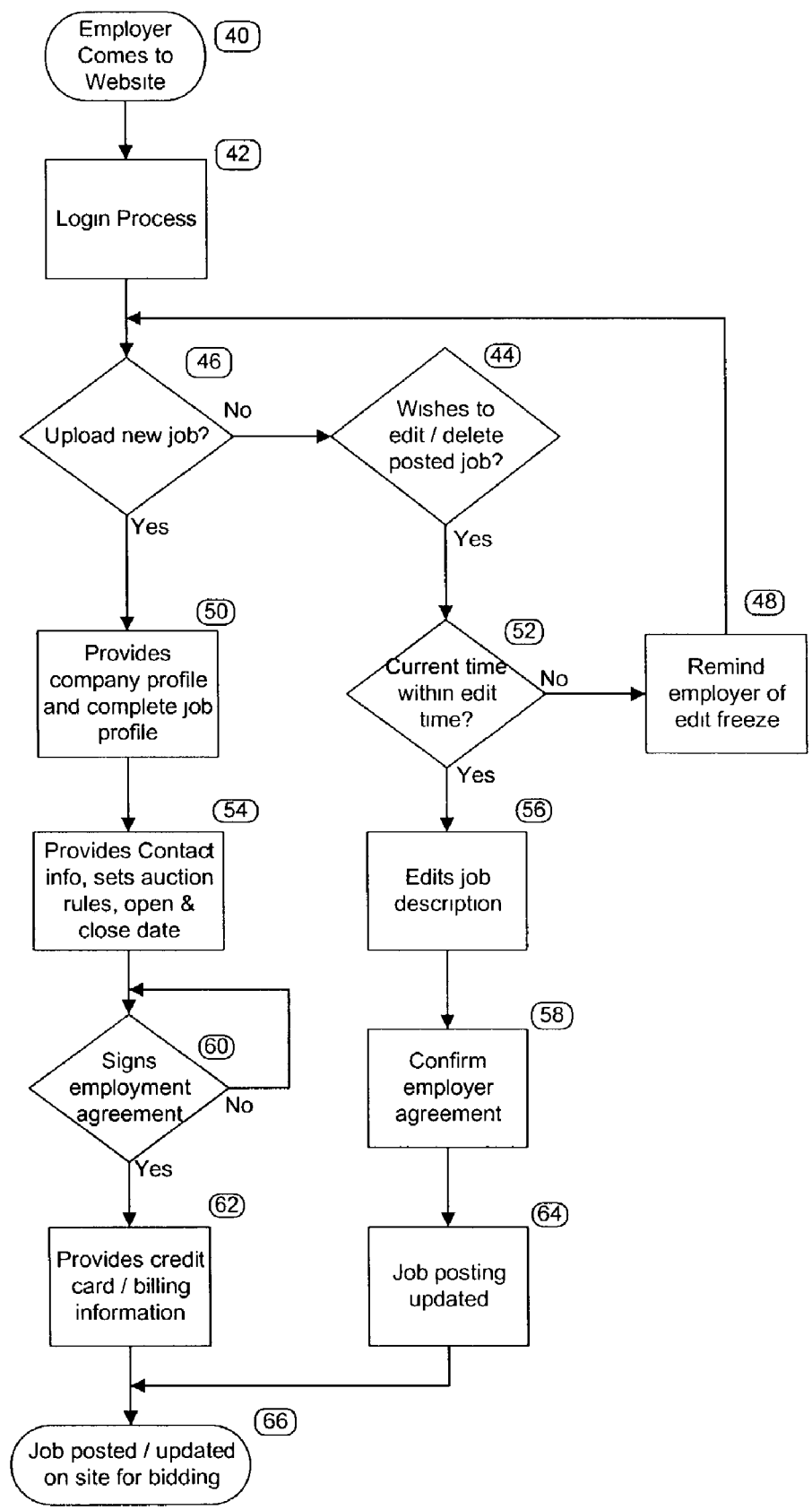
FIG. 2 is a flow chart detailing a client's posting or updating of an auction using the website.

When a registered employer comes to the website FIG. 2, he would first go through the login process 42 detailed in FIG. 1, then select 46 whether he wants to add a new job listing or edit an existing one 44. Employers who are adding a new job listing will provide details about the job, such as company description 50 and job profile, and contact information and auction rules, 54. The employer then agrees to the terms and conditions 60 of using the invention, provides billing information 62 and opens the auction for public bidding, 66. Employers who wish to edit existing job listings 44 will be able to do so for up to a specified time before the announced end of the auction 52, otherwise they will not be able to make changes 48. If they are able to make changes, they would modify the job related information 56, confirm acceptance of the employer agreement 58, and publish the modified job listing 64.

Figure 3:
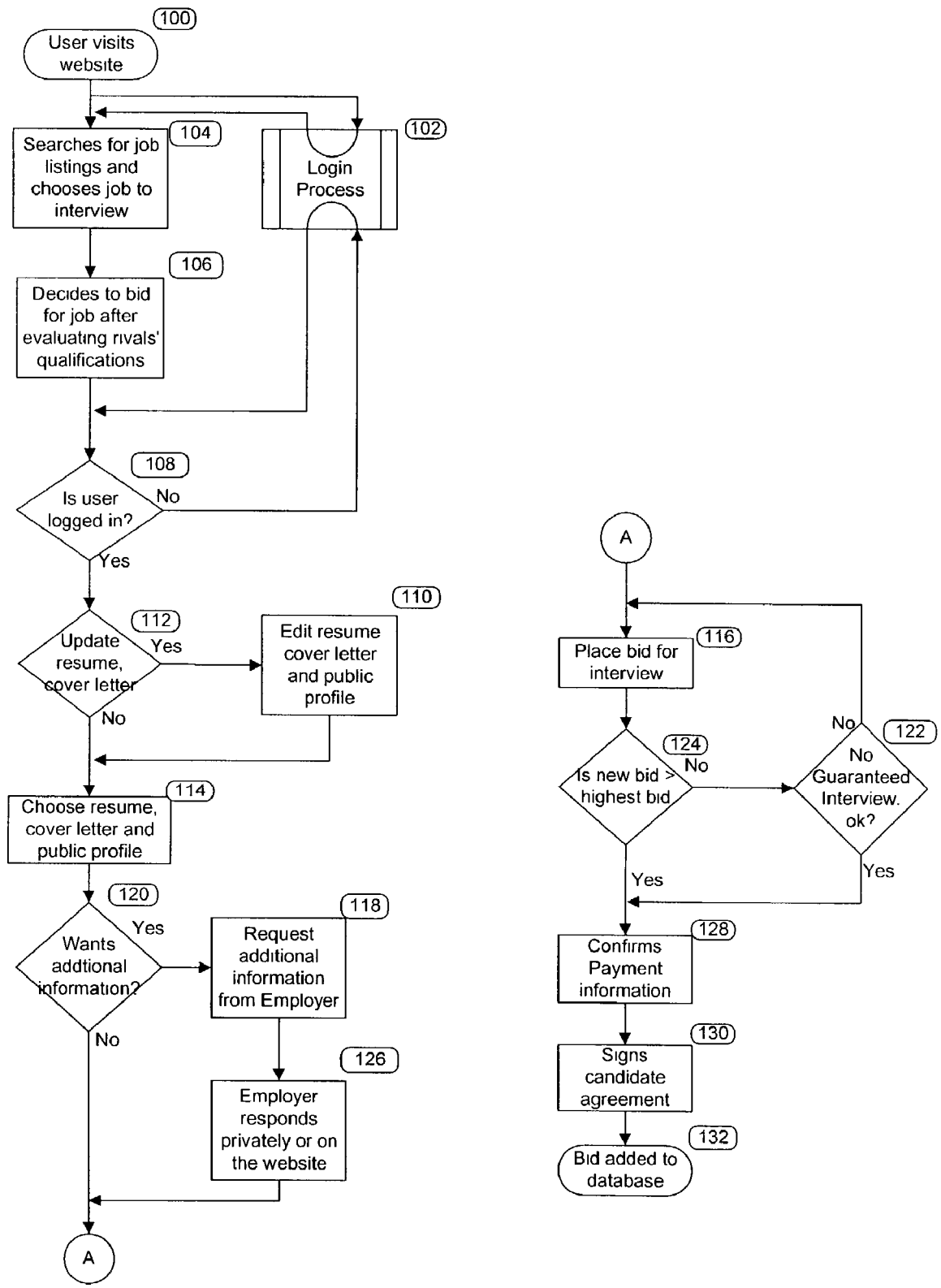
FIG. 3 is a flow chart of the candidate's (bidder) use of the website maintained by the auctioneer.

Once one or more jobs are listed on the website, a candidate can visit the site as shown in FIG. 3, 100 and search for job advertisements 104 that would be appropriate to his/her qualifications and interest. At any point during this time, the candidate may wish to login 102 so that his/her stored preferences, documents and templates can be retrieved. Based on the results of the search, the candidate may decide to bid 106 for a given opportunity. If the candidate is not logged in 108 he/she is led through the login process 102. Logged in candidates can access their stored resume, and cover letters and update them 110 if necessary 112. The candidate can then select the resume, cover letter and profile 114 that would be the best suitable to the job description. If the candidate requires more information, 120 he/she can request it from the employer 118 using the site. The employer may choose to respond to the questions 126 privately or via the public website. Next, the candidate may offer a monetary bid 116 for an interview with the company. If the new bid is lower than the current highest bid 124, the candidate is warned that an interview is not guaranteed 122. If the candidate accepts a lower rung 124, he/she would provide payment information 128 and agree to the terms and conditions 130 of using the system. The bid is then added to the database 132.

Figure 4:
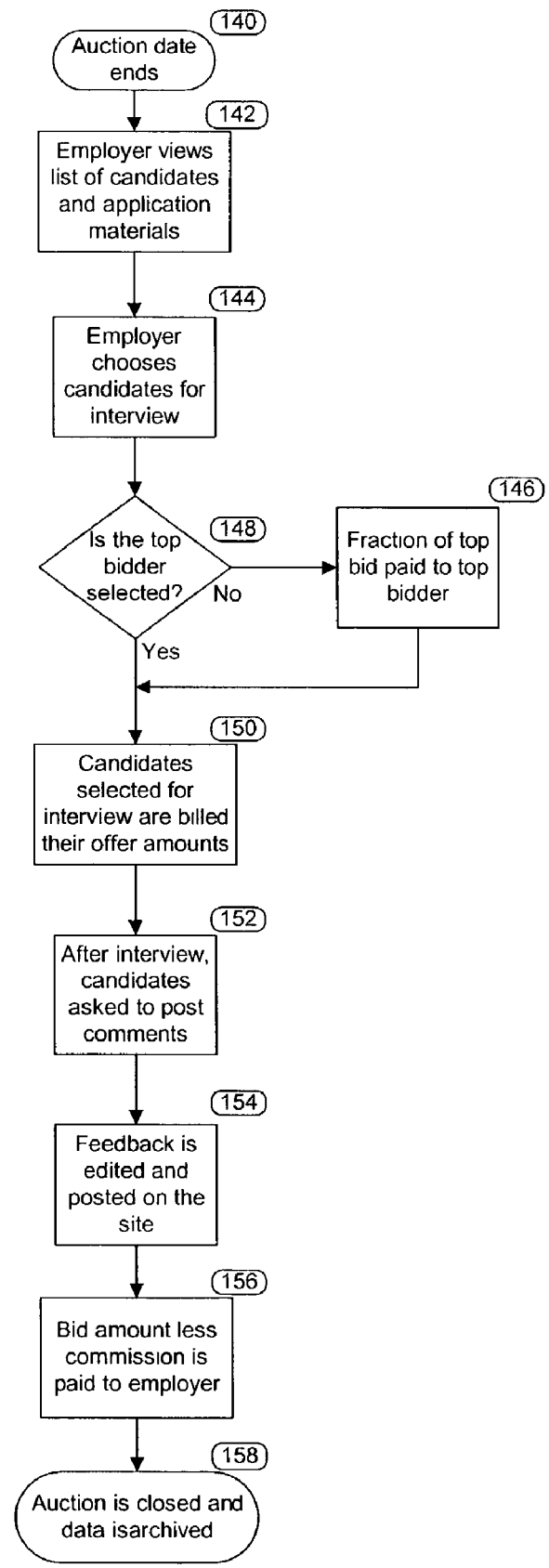
FIG. 4 is a flow chart of the process followed at the end of an auction.

Once the auction is closed to further public bidding, 140, FIG. 4, the employer views a final list of candidates, along with their offer amounts and other application materials 142. From this information, the employer is able to select candidates for interviews based on their offer prices, their fulfillment of job requirements and qualifications and other expressions of interest and suitability for the position 144. If the employer, for any reason, does not wish to interview the top bidder 148, the employer can decide instead to pay a fraction of the top bid to the top bidder 146 in lieu of an interview opportunity. The candidates who are selected for interview 144 are all charged their offer amounts 150. Following the interview, candidates are presented with an opportunity to post comments on their interview experience 152, which are edited and published on the site 154. The aggregate bid amount from all the interviewed candidates less commission is then paid to the employer 156. The bidding history, outcomes, comments and other communications are stored in the database 158.

Figure 5:
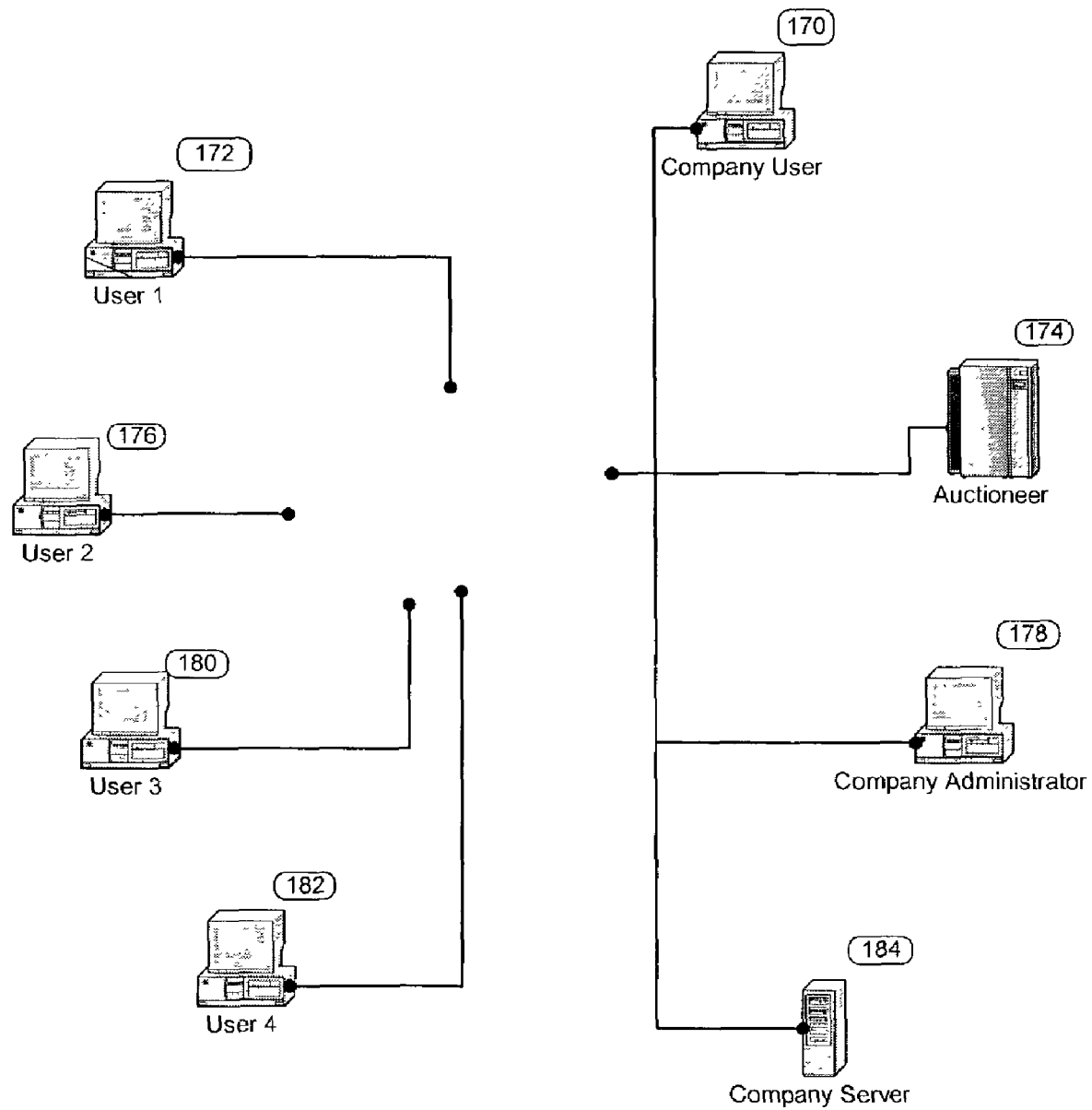
FIG. 5 is a depiction of the network that connects a plurality of bidders with a plurality of employers' and the auctioneer's computers.

The process shown in the preceding illustrations, FIGS. 1 through 4 can be implemented on a variety of electronic networks. In the preferred embodiment, shown in FIG. 5 the invention is developed to work using the Internet to make the auctioneer's computer 174 accessible to a plurality of candidates' computers 172, 176, 180, and 182. The auctioneer's computer 174 comprises the website and the database that stores applicant, application, bid and job listing information. Using commercially available Internet browser software and by using the Internet, a candidate may access the website and participate in the auction. The company user 170 also uses the Internet to access the auctioneer's website and participates in the auction as shown in FIG. 2 and FIG. 4. The company administrator 178 has the ability to access the ongoing auctions posted by different users within the same company. The administrator also can audit the various offers placed and accepted on behalf of the company. The company server 184 comprises a customized version of the invention that individual companies may choose to purchase from the auctioneer and maintain on their premises. This server only stores the job listings and applications that pertain to their company. This server may allow access to the data on the auctioneer's computer and access from the auctioneer's website.

What is claimed is:

1. An electronic auction method for auctioning an interview for a job, wherein the auction is conducted using at least an auctioneer's computer and one or more bidders' computers communicating electronically over a network, wherein a client may be the auctioneer, or the client and auctioneer may be separate, the method comprising:
   establishing criteria for the auction and storing the criteria on the auctioneer's computer;
   allowing potential bidders to access the stored criteria from a bidder's computer by electronic communication with the auctioneer's computer;
   storing in the auctioneer's computer submitted bid information, including relevant job-related information and a monetary bid;
   allowing potential bidders to view stored bid information before submitting a bid;
   selecting one or more winning bids based at least in part on the stored monetary bids and at least in part on submitted and stored job-related information;
   allowing the user to select other bids with monetary values less than the monetary value of the highest bid; and
   billing winning bidders their bid amounts.

2. The electronic auction method of claim 1 wherein the network comprises the Internet.

3. The electronic auction method of claim 1 further comprising requiring a potential bidder to log in to the auction before accepting a bid from the potential bidder.

4. The electronic auction method of claim 3 wherein the storing step comprises accepting a bid from a potential bidder, and only then storing bid information.

5. The electronic auction method of claim 4 further comprising comparing a bid to previous bids, and notifying the bidder if the bid is not the highest bid, before storing bid information.

6. The electronic auction method of claim 5 further comprising allowing a bidder to revise the bid in response to the notification.

7. The electronic auction method of claim 6 further comprising allowing the bidder to choose to maintain a current bid, even though it is not the highest bid, and in response storing the bid.

8. The electronic auction method of claim 1 further comprising allowing the user to refuse the highest bid.

9. The electronic auction method of claim 8 further comprising requiring the user to make a payment to the highest bidder if the user refuses the highest bid.

10. The electronic auction method of claim 9 wherein the payment compnses a fraction of the highest bid.

11. The electronic auction method of claim 1 further comprising allowing winning bidders to post comments in the auctioneer's website.

12. The electronic auction method of claim 11 wherein the winning bidders are allowed to post comments after their interview.

13. The electronic auction method of claim 1 further comprising, when the auctioneer and the client are separate, requiring the auctioneer to pay to the user the amount of the winning bids, less a commission.

14. The electronic auction method of claim 1 further comprising establishing parameters for the bidding, and then verifying whether a bid meets these parameters before accepting the bid.

15. The electronic auction method of claim 1 further comprising allowing third-party nonbidders to observe aspects of the auction.

16. The electronic auction method of claim 1 further comprising allowing bidders to make offers that have a monetary value tess than the monetary value of an existing bid or bids.

17. The electronic auction method of claim 1 further comprising allowing a bidder to create an account with the auctioneer for use during individual auctions.

18. The electronic auction method of claim 17 where finds are paid into the account by a person, organization or entity other than the bidder.

19. The electronic auction method of claim 17 where funds are paid into the account through a coupon or code that is obtained or purchased from a third-party or from the auctioneer.

20. The electronic auction method of claim 1 where no two bids are allowed to be of the same monetary value.

21. The electronic auction method of claim 1 where bids are required to have at least a specified minimum monetary difference in value.

22. The electronic auction method of claim 1 further comprising establishing a specified minimum monetary value for any bid to be accepted.

23. The electronic auction method of claim 22 where two or more bids arc allowed to be of the same monetary value if they arc at least at the specified minimum value.

24. An electronic auction method for auctioning an interview for a job, wherein the auction is conducted using at least an auctionee's computer and one or more bidders' computers communicating electronically over the Internet, wherein a client may be the auctioneer, or the client and auctioneer may be separate, the method comprising:
   establishing criteria for the auction and storing the criteria on the auctioneer's computer;
   allowing potential bidders to access the stored criteria from a bidder's computer by electronic communication with the auctioneer's computer;
   requiring a potential bidder to log in to the auction before accepting a bid from the potential bidder;
   storing in the auctioneer's computer submitted bid information, including relevant job-related information and a monetary bid, comprising accepting a bid from a potential bidder, and only then storing bid information;
   comparing a bid to previous bids, and notifying the bidder if the bid is not the highest bid, before storing bid information;
   allowing a bidder to revise the bid in response to the notification;
   allowing the bidder to choose to maintain a current bid, even though it is not the highest bid, and in response storing the bid;
   allowing the user to refuse the highest bid;
   selecting one or more winning bids based in part on the stored monetary bids and in part on submitted and stored job-related information;
   allowing the user to select other bids with monetary values less than the monetary value of the highest bid; and
   billing winning bidders their bid amounts.

25. An electronic auction method for auctioning an interview for a job, wherein the auction is conducted using at least an auctioneer's computer and one or more bidders' computers communicating electronically over the Internet, wherein a client may be the auctioneer, or the client and auctioneer may be separate, the method comprising:
   establishing criteria for the auction and storing the criteria on the auctioneer's computer;

allowing potential bidders to access the stored criteria from a bidder's computer by electronic communication with the auctioneer's computer;

requiring a potential bidder to log in to the auction before accepting a bid from the potential bidder;

storing in the auctioneer's computer submitted bid information, including relevant job-related information and a monetary bid, comprising accepting a bid from a potential bidder, and only then storing bid information;

allowing potential bidders to view stored monetary and job-related bid information before submitting a bid;

comparing a bid to previous bids, and notifying the bidder if the bid is not the highest bid, before storing bid information;

allowing a bidder to revise the bid in response to the notification;

allowing the bidder to choose to maintain a current bid, even though it is not the highest bid, and in response storing the bid;

allowing the user to refuse the highest bid;

requiring the user to make a payment to the highest bidder if the user refuses the highest bid;

selecting one or more winning bids based in part on the stored monetary bids and in part on submitted and stored job-related information;

allowing the user to select other bids with monetary values less than the monetary value of the highest bid; and billing winning bidders their bid amounts.

* * * * *